Patented Mar. 15, 1927.

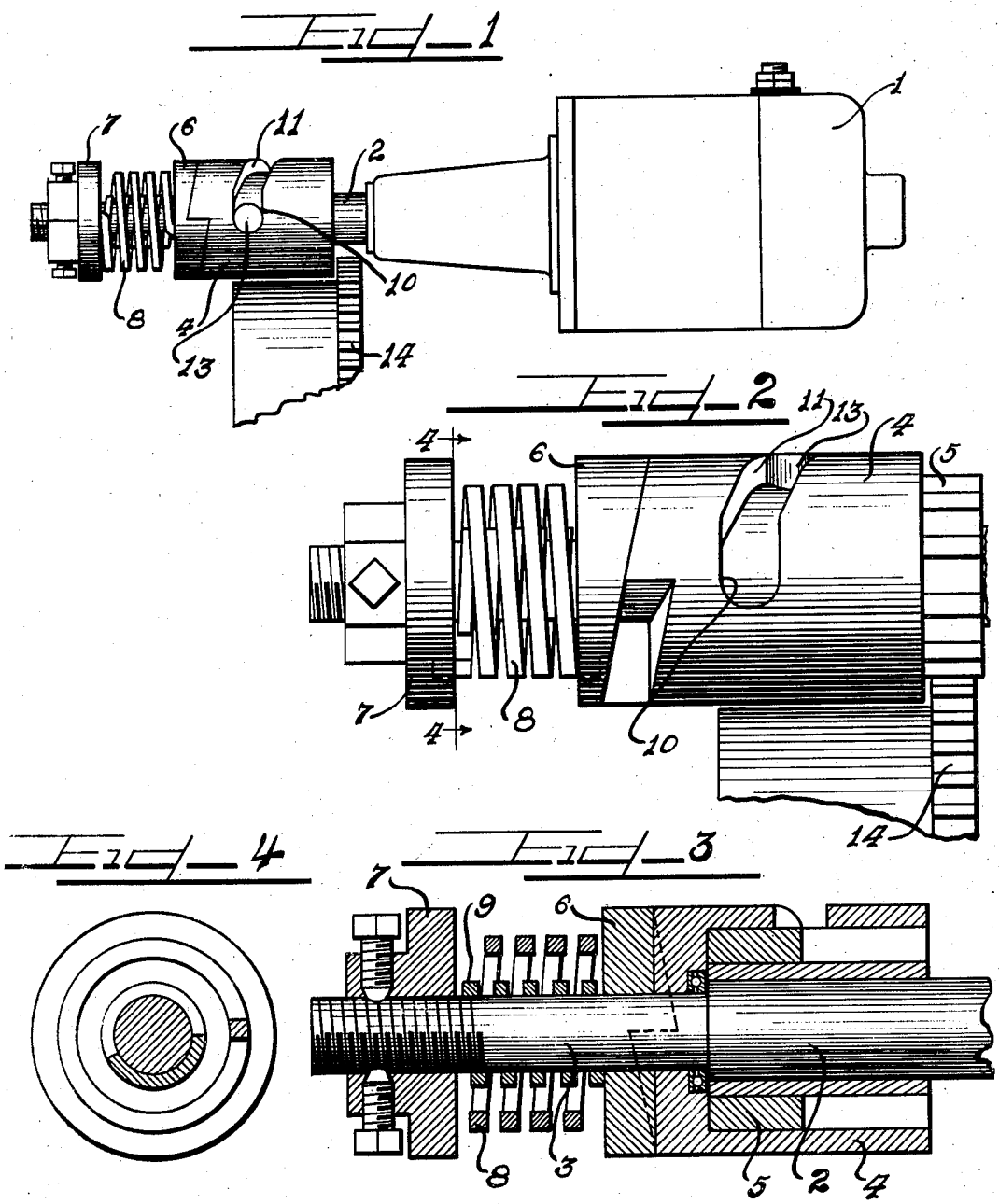

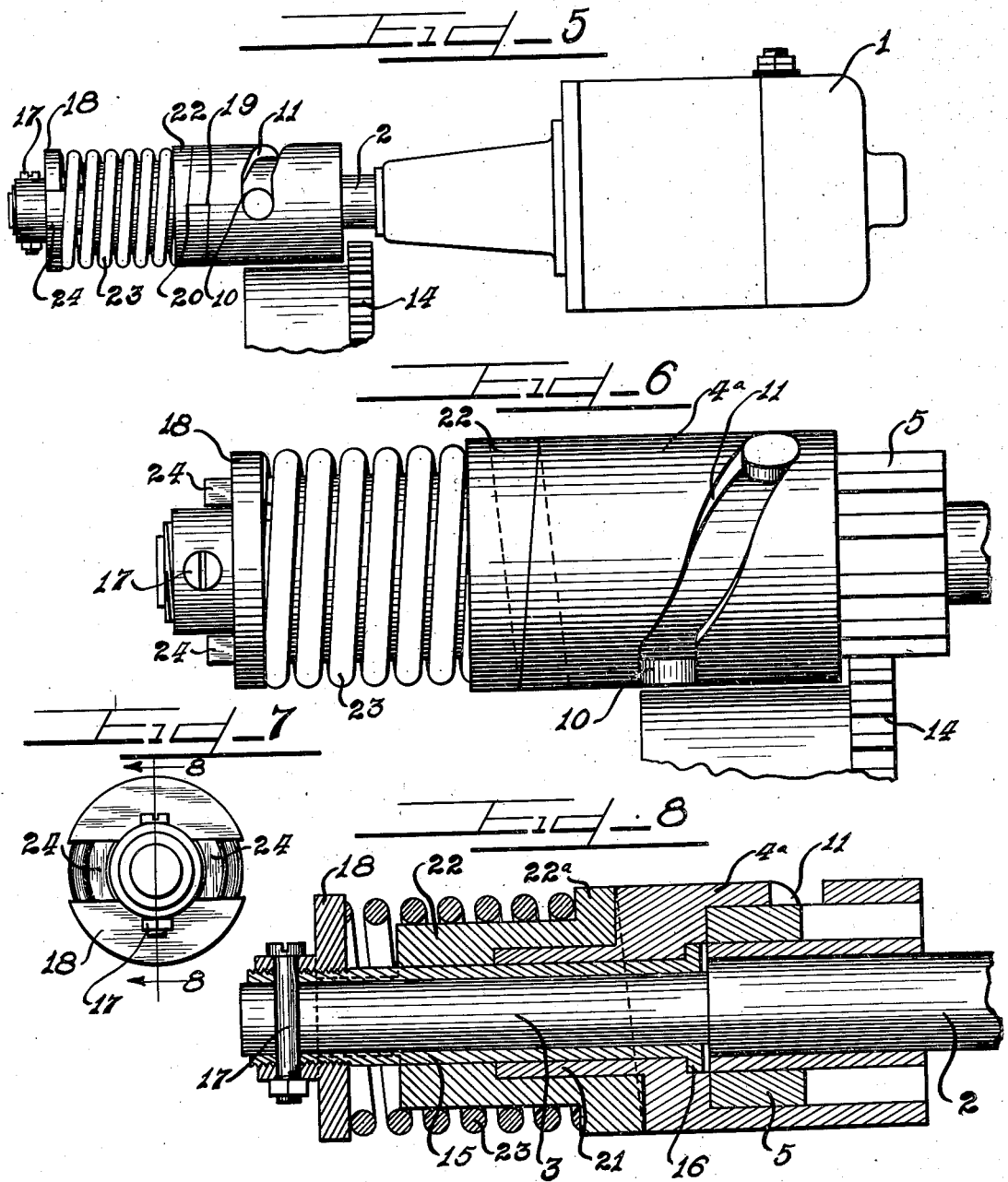

1,621,102

UNITED STATES PATENT OFFICE.

ODILON BRISBOIS, OF CHICAGO, ILLINOIS.

ENGINE STARTER.

Application filed June 18, 1923. Serial No. 646,035.

This invention relates to an engine starter of that type in which a driven member is caused to travel longitudinally into mesh with an engine member for rotating the same.

It has been proposed to use a yielding friction disk clutch in such starters, but a satisfactory yield for the functions to be accomplished could never be attained by such a disk clutch, so coil springs have been used in place of such friction disk clutches. Whenever back fire occurred the spring would break and incapacitate the starter for further use.

It is among the objects of this invention to provide a yielding friction clutch that will provide a constant yield during the operation of starting the engine, and that will yield under a predetermined load such as arises from the back kick of an engine.

It is also an object in connection with such a clutch to provide a connection for the driven member having a yieldable inclination for preventing binding of the driven member and engine member when there is an abutting relation.

With these and other objects in view which will become more apparent in the following description and disclosures, this invention comprises the novel mechanism and combinations hereinafter described and more particularly pointed out and defined in the appended claims.

In the accompanying drawings, which illustrate a preferred embodiment of this invention, and in which similar reference numerals refer to similar features in the different views:

Figure 1 is an elevational view of a starting motor involving my invention with a portion of the fly-wheel of the engine.

Figure 2 is an enlarged elevational view of the starting mechanism.

Figure 3 is an enlarged longitudinal section through the starting mechanism.

Fig. 4 is a section on the line 4—4 of Figure 2, showing parts in elevation.

Figure 5 is an elevational view of a starter embodying a modified form of the invention.

Figure 6 is an enlarged elevational view of the starting mechanism.

Figure 7 is a front elevational view of the starting mechanism.

Figure 8 is an enlarged section taken substantially upon the line 8—8 of Figure 7.

As shown on the drawings:

In referring now to Figures 1 to 4 of the drawings, there is illustrated the usual starting motor 1, having a shaft 2 provided with a reduced outer end 3 whereby an annular shoulder is formed at the inner end of the reduced portion. A cylindrical sleeve member 4 is loosely mounted upon the motor shaft; one end of the sleeve is open and is much larger than the shaft to provide a cylindrical recess therein for receiving the driven member 5 which is in the form of a pinion. The other end of the sleeve is closed except for a bearing aperture to receive the reduced end of the motor shaft, and said end normally rests against the annular shoulder on the motor shaft. The outer surface of the closed end of the sleeve is provided with curved or cam surfaces somewhat similar to those on a jaw clutch.

A clutch member 6 is loosely mounted upon the reduced end 3 of the motor shaft adjacent the cam surface of the sleeve 4. This clutch member has its surface contiguous to the sleeve 4 provided with curved or cam surfaces oppositely directed with respect to those on the cylindrical sleeve 4, so that there will be an interfitting relation between the two somewhat similar to the well-known clutch.

A collar 7 is adjustably secured upon the end of the motor shaft and a pair of concentric coil springs 8 and 9 are positioned between the collar 7 and clutch member 6; the ends of the outer coil spring 8 are preferably respectively anchored in the collar 7 and clutch member 6, though this is not necessary.

The sleeve 4 is provided with a spiral guideway comprising the straight transverse portion 10 at right angles to the axis of the motor shaft, and an inclined portion 11 substantially at an angle of 25° to the transverse portion, or at an acute angle of 65° with respect to the axis of the motor shaft. This slope of the slot portion 11 allows the stud 13 on the gear 5 which projects into said slot a free yield when there is an abutting relation between the pinion 5 and the gear 14 shown as constituting a part of the fly-wheel of the engine, and the transverse portion 10 in which the stud 13 is normally seated retards the longitudinal travel of the pinion so that the motor can acquire sufficient torque before the gears 5 and 14 are brought into mesh.

In operation, the clutch member 6 and cylindrical sleeve 4 are not positively connected as is the case in the usual jaw clutch; the normal direction of rotation is opposite to that effecting a positive coupling relation and normally tends to uncouple the sleeve 4 and clutch member 6. This tendency of the parts to uncouple is yieldingly resisted by the springs 8 and 9 which are so designed that they will normally resist the force arising from starting the engine, so the driving frictional engagement occurs between the curved or cam surfaces of the sleeve and clutch member 6 produced by the springs 8 and 9. This frictional engagement is proportioned to the tension of the springs, which yieldingly press the two clutch surfaces together. In case there should occur an abnormal load such as arises from the back kick of the engine, the springs 8 and 9 will be sufficiently compressed so that the clutch member 6 will freely ride over the cam surface on the sleeve 4, and break the frictional driving connection.

The clutch member 6 and the opposed face of the cylinder sleeve 4 constitute in effect a constantly yielding friction clutch that is responsive to varying degrees of load, the frictional connection being broken upon overload which is previously predetermined.

In the modified form of the invention shown in Figures 5, 6 and 8 which is somewhat preferred over the first form, a contained structure is illustrated which may be readily assembled with respect to the motor shaft. To this end, a bearing sleeve 15 having a small collar 16 on its inner end is secured upon the reduced portion 3 of the motor shaft 2 by means of a bolt 17 extending through the sleeve and shaft. The outer end of the sleeve is threaded and a collar 18 is screwed upon this threaded portion, the bolt 17 also extending through the hub of the collar. The collar 16 on this sleeve is slightly spaced from the shoulder formed at the inner end of the reduced portion 3 of the motor shaft to avoid friction.

In this form, the cylindrical sleeve 4ª that corresponds to the sleeve 4 in the first form has the cylindrical recess that receives the pinion 5 counter bored to receive the flange 16. The outer face of this cylindrical sleeve 4ª is provided with a spiral surface that extends from the point 19 to the point 20 as indicated in Figure 1 to provide a clutch face. The cylindrical sleeve 4ª has a reduced bearing portion or neck 21 that extends outwardly beyond the clutch face. A clutch member 22 is slidingly journalled upon the sleeve 15 and is counter bored to telescope over the bearing neck 21. The inner end of the clutch member 22 has a radial flange 22ª, the front face of which has a spiral formation which extends between the points 19 and 20 as shown in Figure 1. This spiral face abuts the spiral face upon the sleeve 4ª and forms a yielding friction clutch due to the coil spring 23 which is positioned over the clutch member 22 between the collar 18 and the radial flange 22ª. The outer end of the clutch member 22 is provided with a pair of tongues or lugs 24 that slidingly extend through the collar 18 and slidingly spline the clutch member 22 on the motor shaft.

The sleeve 4ª has a spiral slot comprising a short transverse portion 10 and an inclined portion 11 of yieldable inclination, and the pinion 5 has a radial stud projecting into said spiral slot as in the first form, and in case of a tooth on tooth engagement of the pinion 5 with the fly wheel gear 14, the impact will cause the pinion 5 to recede in the guideway on account of the inclined yieldable slot; the spring 23 being sufficiently strong so as not to yield from a tooth on tooth impact.

In the operation of this starter, rotation of the motor shaft in the proper direction will cause rotation of the clutch member 6 or 22 carrying the sleeve 4 or 4ª therewith, the rotation of which will cause the driven pinion 5 to advance longitudinally into mesh with the fly wheel gear 14 for starting the same. As the load of starting the gear 14 is gradually picked up, there will be a yield between the clutch member and the sleeve due to the compression of the resilient means, so that any initial shock may be absorbed. During this yield, the clutch member will slide outwardly and put the resilient means under greater compression thereby increasing the friction. The resilient means should, however, be sufficiently strong to resist the necessary or normal starting-torque. Under abnormal load, the resilient means will yield sufficiently to allow the clutch member to ride over the clutch surface of the cylindrical sleeve.

It is characteristic of this invention that the clutch will initially yield when picking up the load to avoid the shocks from starting the engine gear, and that the clutch will finally yield under an abnormal load, thereby preventing injury to the motor or starting mechanism. As any change in the starting torque will affect the compression of the yielding means, there will be a similar variation in the frictional engagement between the clutch member and the cylindrical sleeve. So it might be said that the clutch will yield according to the torque.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In an engine starter, a motor shaft, a sleeve loosely mounted upon said shaft and having a hollow cylindrical portion provided with a spiral guideway and a lateral clutch face, a driven member normally housed within said cylindrical portion and having a radial stud projecting into said guideway, a clutch member loosely mounted upon said shaft and normally coacting with the clutch face of said sleeve, a collar secured upon said shaft, and yielding means between said collar and clutch face.

2. In an engine starter, comprising a motor shaft, a driven member mounted thereon, a sleeve surrounding said shaft and driven member and having a spiral guideway, said driven member having a stud projecting into said guideway, said sleeve having laterally extending inclined parts, a co-operating member having coacting inclined parts, and a spring connecting said shaft and co-operating member.

In testimony whereof I have hereunto subscribed my name.

ODILON BRISBOIS.